US012719402B2

(12) United States Patent
Tung

(10) Patent No.: US 12,719,402 B2
(45) Date of Patent: Aug. 25, 2026

(54) MOUNTING BRACKET FOR AN OFFSHORE PHOTOVOLTAIC MODULE

(71) Applicant: SUN RISE E & T CORPORATION, Pingtung City (TW)

(72) Inventor: Chi-Hsu Tung, Pingtung City (TW)

(73) Assignee: SUN RISE E & T CORPORATION, Pingtung City (TW)

( * ) Notice: Subject to any disclaimer, the term of this patent is extended or adjusted under 35 U.S.C. 154(b) by 48 days.

(21) Appl. No.: 19/002,470

(22) Filed: Dec. 26, 2024

(65) Prior Publication Data

US 2025/0233549 A1 Jul. 17, 2025

(30) Foreign Application Priority Data

Jan. 17, 2024 (TW) ................................ 113101902

(51) Int. Cl.
*H02S 20/30* (2014.01)
*B63B 35/44* (2006.01)

(52) U.S. Cl.
CPC .............. *H02S 20/30* (2014.12); *B63B 35/44* (2013.01); *B63B 2035/4453* (2013.01)

(58) Field of Classification Search
CPC .. H02S 20/30; B63B 35/44; B63B 2035/4453
See application file for complete search history.

(56) References Cited

U.S. PATENT DOCUMENTS 5,125,608 A * 6/1992 McMaster ............... F24S 25/12 248/676
9,444,395 B2 * 9/2016 Tung ....................... F24S 25/65
9,523,517 B2 * 12/2016 Warpup .................. F24S 25/12
12,060,136 B2 * 8/2024 Sinn .......................... B63B 1/14
2023/0257080 A1 * 8/2023 Thøgersen ............. B63B 35/44 136/244

FOREIGN PATENT DOCUMENTS

CN 216709585 U 6/2022
CN 116961530 A 10/2023

OTHER PUBLICATIONS

Search Report appended to an Office Action, which was issued to Taiwanese counterpart application No. 113101902 by the TIPO on Oct. 29, 2024, with an English translation thereof.

* cited by examiner

*Primary Examiner* — Anita M King
(74) *Attorney, Agent, or Firm* — Nixon & Vanderhye PC

(57) ABSTRACT

A mounting bracket for an offshore photovoltaic module includes a buoyancy body extending along a lengthwise direction, a first pole and a second pole disposed on and extending from the buoyancy body along a height direction and spaced apart from each other in the lengthwise direction, and a reinforcing beam and a carrying beam connected with the first and second poles. Each of the first and second poles has a U-shaped cross-section for increasing the second moment of area, thereby improving the resistance to flexure of the first and second poles. The reinforcing beam extending in an inclined manner to further improve the resistance to flexure in the lengthwise direction so as to enhance the rigidity and durability of the entire offshore photovoltaic module assembly.

7 Claims, 5 Drawing Sheets

MOUNTING BRACKET FOR AN OFFSHORE PHOTOVOLTAIC MODULE

CROSS-REFERENCE TO RELATED APPLICATION

This application claims priority to Taiwanese Patent Application No. 113101902, filed on Jan. 17, 2024, and incorporated by reference herein in its entirety.

FIELD

The disclosure relates to an offshore photovoltaic module, and more particularly to a mounting bracket for an offshore photovoltaic module.

BACKGROUND

Referring to FIG. 1, a conventional offshore photovoltaic device 1 includes a buoyancy platform 11 floatable on the ocean, a mounting bracket unit 12 securely mounted on the buoyancy platform 11, and a photovoltaic panel 13 disposed on and inclined relative to an upper end of the mounting bracket unit 12. The mounting bracket unit 12 includes a pair of long poles 121 and a pair of short poles 121 erected on the buoyancy platform 11, and two carrying beams 122 each connected with one long pole 121 and one short pole 121 to extend in an inclined manner for carrying the photovoltaic panel 13. A plurality of offshore photovoltaic devices 1 are assembled together to constitute a regenerative solar energy generation field. However, such devices need to face the complex marine environment. For example, those poles 121 frequently need to withstand waves coming from the lateral sides thereof, which impacts the poles 121 and causes flexure to the poles 121 and might make the poles 121 to be distorted and broken.

SUMMARY

Therefore, an object of the disclosure is to provide a mounting bracket for an offshore photovoltaic module that can alleviate at least one of the drawbacks of the prior art.

According to the disclosure, the mounting bracket for an offshore photovoltaic module includes a buoyancy body extending along a lengthwise direction, a first pole disposed on and extending from the buoyancy body along a height direction that is transverse to the lengthwise direction, a second pole disposed on and extending from the buoyancy body along the height direction and spaced apart from the first pole in the lengthwise direction, a reinforcing beam extending along the lengthwise direction and connected with the first pole and the second pole, and a carrying beam extending along the lengthwise direction and connected with the first pole and the second pole. The first pole includes a first outer wall which extends along a width direction that is transverse to both of the lengthwise direction and the height direction, and two first side walls which are spaced apart from each other in the width direction. Each of the two first side walls extends from the first outer wall inwardly and along the lengthwise direction. The first outer wall and the two first side walls cooperatively define a first extension slot which extends along the height direction. The second pole includes a second outer wall which extends parallel to the first outer wall, and two second side walls which are spaced apart from each other in the width direction. Each of the two second side walls extends from the second outer wall inwardly and along the lengthwise direction. The second outer wall and the two second side walls cooperatively define a second extension slot which extends along the height direction. The reinforcing beam has two end portions which are respectively inserted into the first extension slot and the second extension slot. A juncture between the reinforcing beam and the first pole is lower than a juncture between the reinforcing beam and the second pole along the height direction. The carrying beam includes a top wall and two end walls which are spaced apart from each other in the width direction. Each of the two end walls extends from the top wall along the height direction toward the buoyancy body. The top wall and the two end walls cooperatively define an opened slot which extends along the lengthwise direction such that upper end portions of the first pole and the second pole are inserted into the opened slot.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
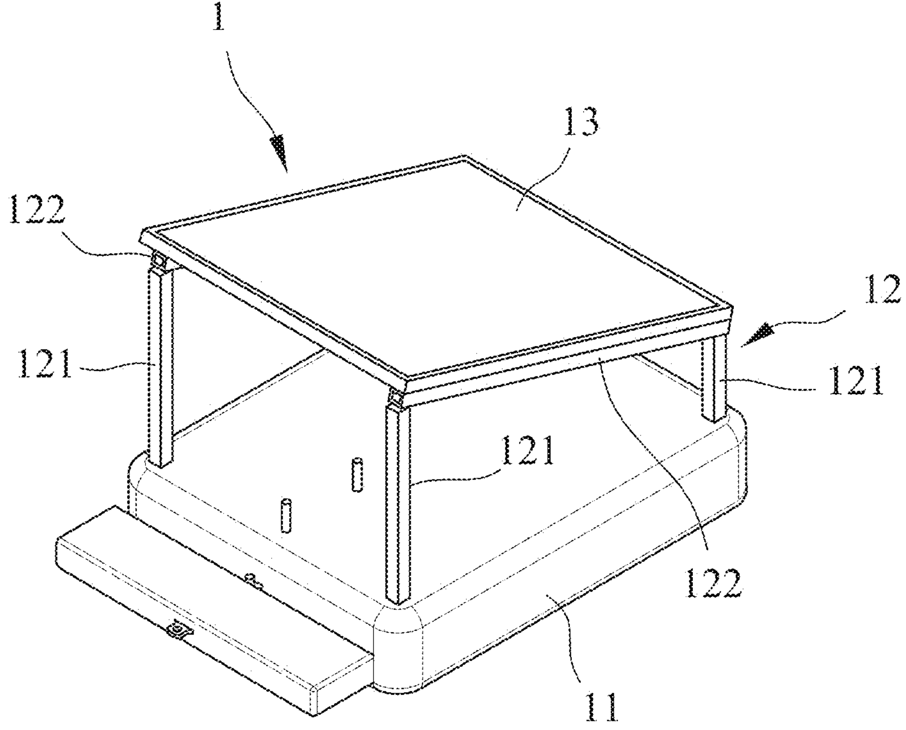
FIG. 1 is a perspective view illustrating a conventional offshore photovoltaic device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
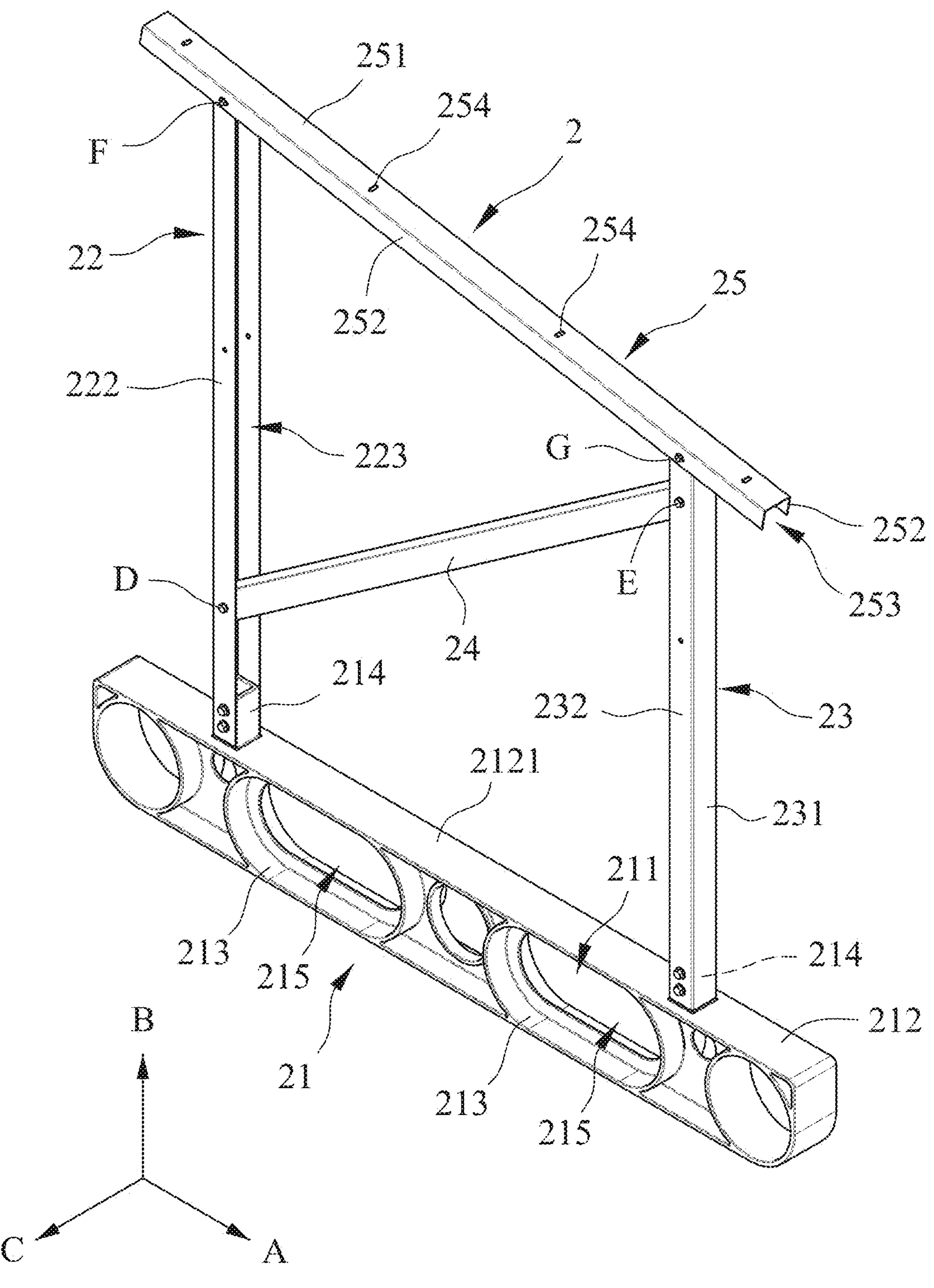
FIG. 2 is a perspective view illustrating an embodiment of a mounting bracket for an offshore photovoltaic module according to the disclosure.

Referring to FIG. 2, an embodiment of a mounting bracket 2 for an offshore photovoltaic module according to the disclosure includes a buoyancy body 21 extending along a lengthwise direction (A), a first pole 22 securely disposed on and extending from the buoyancy body 21 along a height direction (B) that is transverse to the lengthwise direction (A), a second pole 23 securely disposed on and extending from the buoyancy body 21 along the height direction (B) and spaced apart from the first pole 22 in the lengthwise direction (A), a reinforcing beam 24 extending along and inclined relative to the lengthwise direction (A) and securely connected with the first pole 22 and the second pole 23, and a carrying beam 25 extending along the lengthwise direction (A) and securely connected with the first pole 22 and the second pole 23.

The buoyancy body 21 includes a surrounding plate 212 which surrounds and defines a surrounding space 211 that is elongated along the lengthwise direction (A), a plurality of partition walls 213 which are disposed in the surrounding space 211 and connected with the surrounding plate 212, and two tenon tongues 214 which project from a top surface 2121 of the surrounding plate 212 in the height direction (B) and which are respectively and securely connected with the first pole 22 and the second pole 23. The partition walls 213 are spaced apart from one another in the lengthwise direction (A) to divide the surrounding space 211 with a plurality of buffering slots 215 that are spaced apart from each other in the lengthwise direction (A) and opened in a width direction (C) that is transverse to both the lengthwise direction (A) and the height direction (B).

Figure 3:
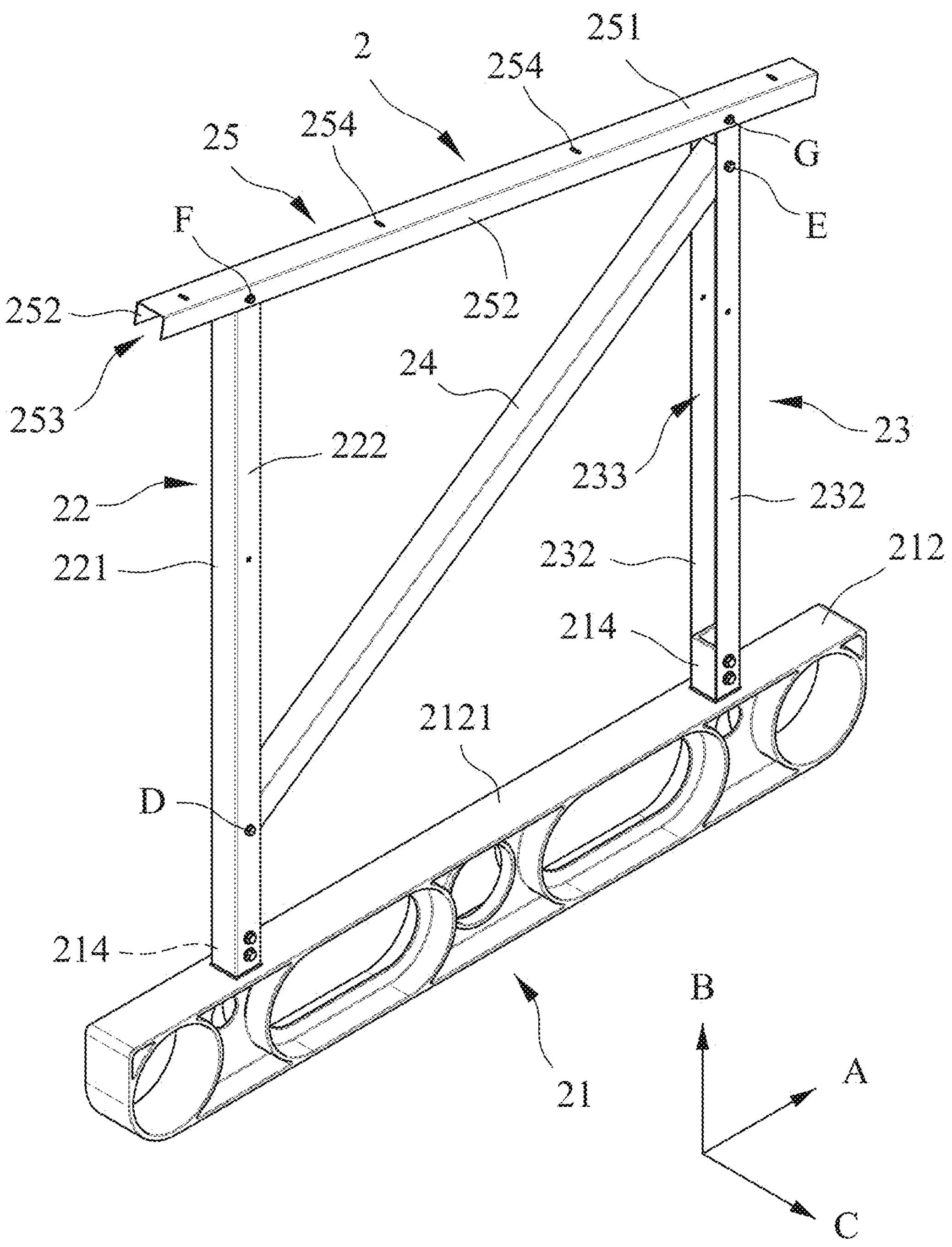
FIG. 3 is a perspective view of the embodiment, taken from another angle.
Figure 4:
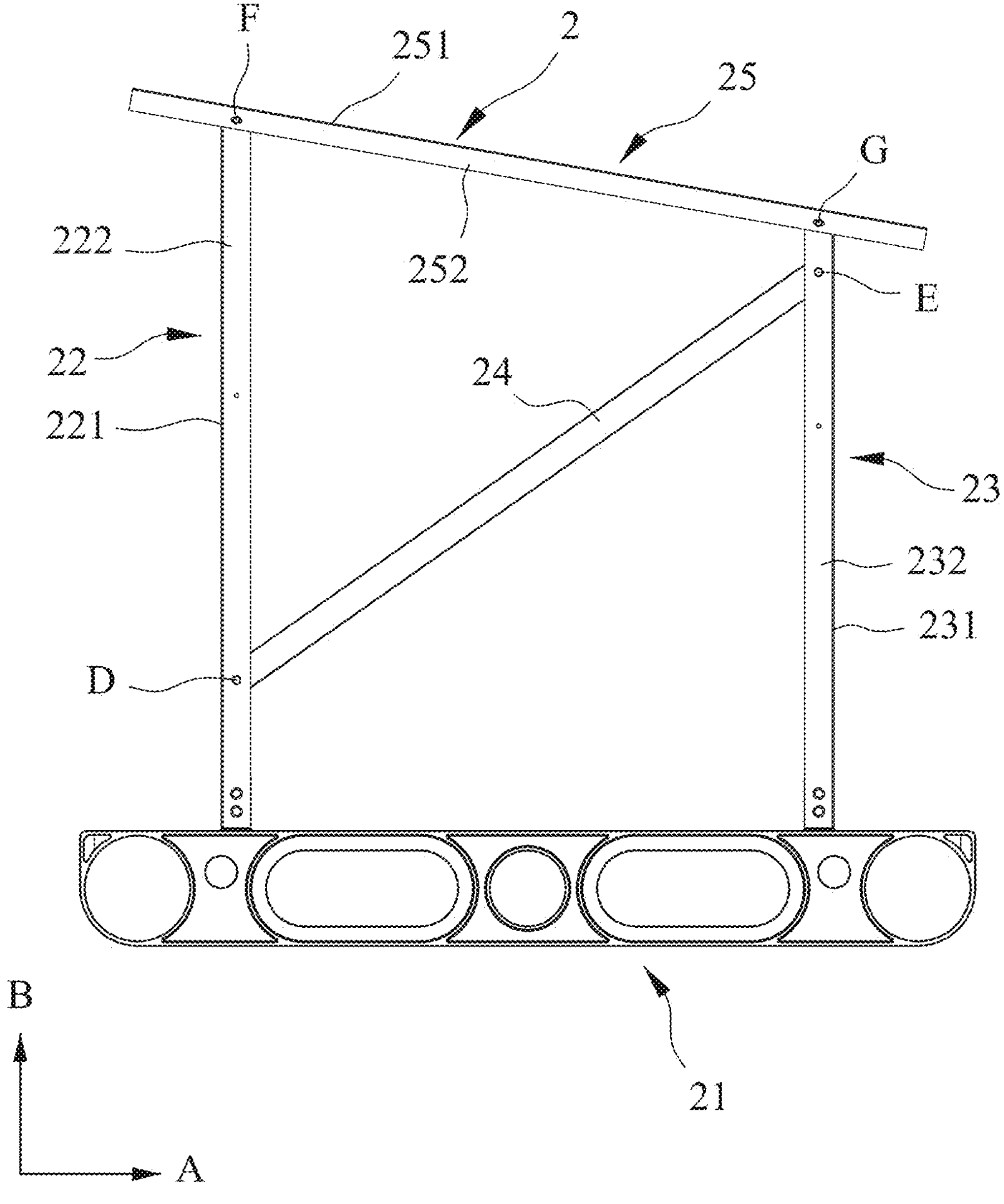
FIG. 4 is a side view of FIG. 2.

With reference to FIGS. 2, 3 and 4, the first pole 22 includes a first outer wall 221 which extends along the width direction (C), and two first side walls 222 which are spaced apart from each other in the width direction (C). Each first side wall 222 extends from the first outer wall 221 along the lengthwise direction (A) and inwardly toward the second pole 23. The first outer wall 221 and the two first side walls 222 cooperatively define a first extension slot 223 which extends along the height direction (B). The second pole 23 includes a second outer wall 231 which extends parallel to the first outer wall 221, and two second side walls 232 which are spaced apart from each other in the width direction (C). Each second side wall 232 extends from the second outer wall 231 along the lengthwise direction (A) and inwardly toward the first pole 22. The second outer wall 231 and the two second side walls 232 cooperatively define a second extension slot 233 which extends along the height direction (B). The two tenon tongues 214 of the buoyancy body 21 are inserted into the first extension slot 223 and the second extension slot 233, respectively, along the height direction (B) to be a mortise-and-tenon joint.

The reinforcing beam 24 has two end portions which are respectively inserted into the first extension slot 223 and the second extension slot 233, and fastened to the first side walls 222 and the second side walls 232. A juncture (D) between the reinforcing beam 24 and the first pole 22 is lower than a juncture (E) between the reinforcing beam 24 and the second pole 23 along the height direction (B) such that the reinforcing beam 24 extends along and is inclined relative to the lengthwise direction (A). In the embodiment, the reinforcing beam 24 has a square-shaped cross-section.

The carrying beam 25 includes a top wall 251 and two end walls 252 which are spaced apart from each other in the width direction (C). Each end wall 252 extends from the top wall 251 along the height direction (B) toward the buoyancy body 21. A juncture (F) between the first pole 22 and the carrying beam 25 is higher than a juncture (G) between the second pole 23 and the carrying beam 25 along the height direction (B) such that the carrying beam 25 extends along and is inclined relative to the lengthwise direction (A). In the embodiment, the inclination angle of the carrying beam 25 relative to the lengthwise direction (A) is smaller than and opposite to the inclination angle of the reinforcing beam 24 relative to the lengthwise direction (A). The top wall 251 and the two end walls 252 cooperatively define an opened slot 253 which extends along the lengthwise direction (A) in an inclined manner such that upper end portions of the first pole 22 and the second pole 23 are inserted into the opened slot 253. The end walls 252 are fastened to the first side walls 222 and the second side walls 232.

Figure 5:
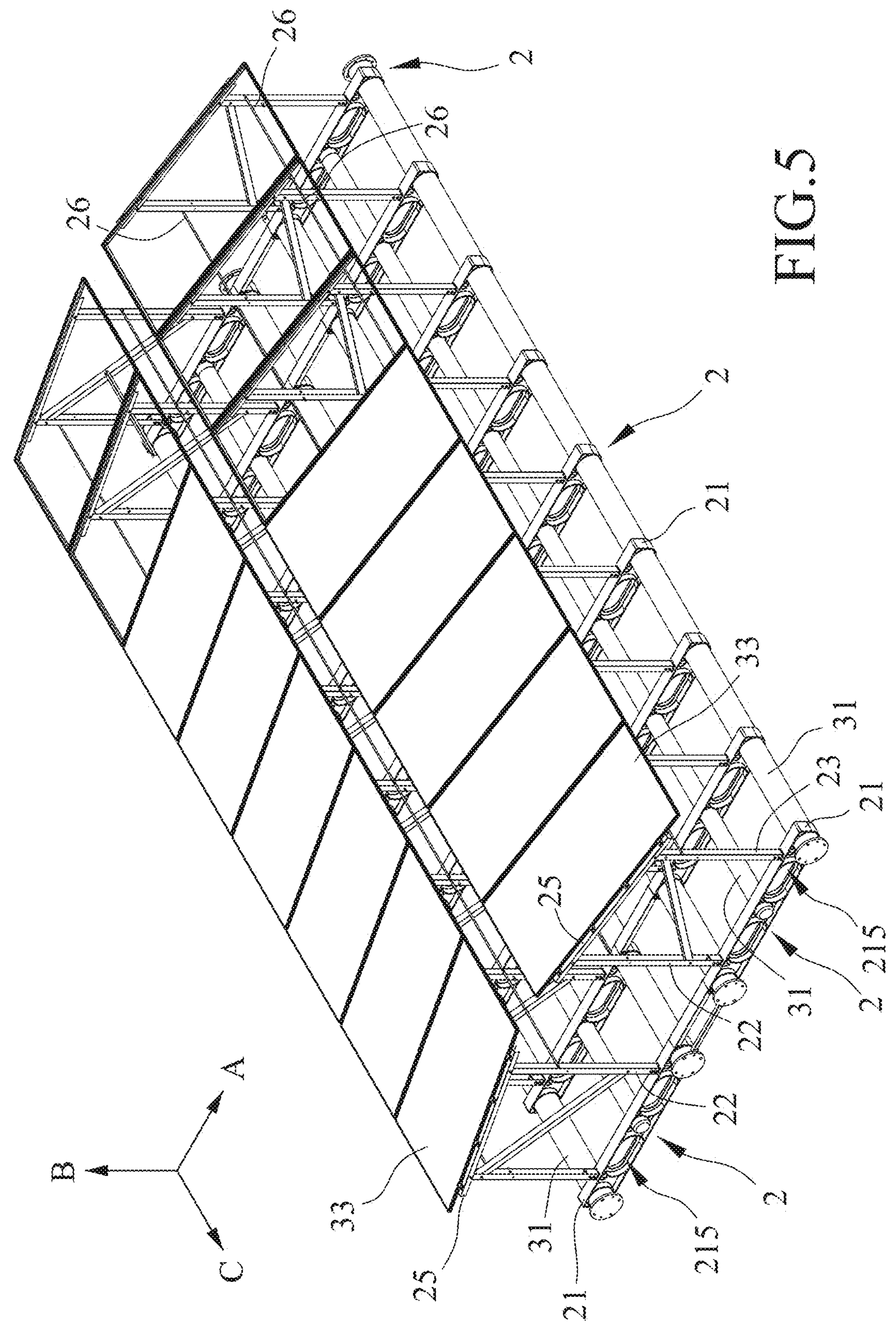
FIG. 5 is a perspective view illustrating a plurality of the mounting brackets of the embodiment assembled for carrying a plurality of photovoltaic panels.

With reference to FIGS. 2, 4 and 5, in use, a plurality of mounting brackets 2 are assembled together through a plurality of buoyancy tubes 31 extending along the width direction (C) for carrying and mounting a plurality of photovoltaic panels 33 thereon. Each buoyancy tube 31 extends through the buoyancy bodies 21 of the mounting brackets 2 which are spaced apart from one another in the width direction (C). Each photovoltaic panel 33 is disposed on two adjacent ones of the mounting brackets 2, and is fastened to the carrying beams 25 of the mounting brackets 2. In some embodiments, the top wall 251 of the carrying beam 25 has a plurality of elongated slots 254 which are spaced apart from each other in the lengthwise direction (A). Each elongated slot 254 extends in the width direction (C) such that the corresponding photovoltaic panel 33 is adjustably fastened to the carrying beam 25 by a fastener (not shown) which extends through the elongated slot 254. With the elongated slots 254 extending in the width direction (C), the fastened position of the photovoltaic panel 33 to the carrying beams 25 is adjustable along the width direction (C) to reduce the tolerance between the adjacent photovoltaic panels 33. Through the buoyancy bodies 21 arranged and spaced apart from each other in the width direction (C), and the buffering slots 215 opened in the width direction (C), the impact of waves to the offshore photovoltaic module assembly may be reduced and stability of thereof may be increased.

Since the plurality of the mounting brackets 2 are connected with each other and assembled together along the width direction (C), the first poles 22 and the second poles 23 of most of the mounting brackets 2 may withstand the waves coming in the lengthwise direction (A). With the first side walls 222 and the second side walls 232 extending in the lengthwise direction (A), and each of the first poles 22 and the second poles 23 having a U-shaped cross-section, the second moment of area of each of the first and second poles 22, 23 is increased, thereby improving the resistance to flexure of the first and second poles 22, 23. Such U-shaped first and second poles 22, 23 may save the material to make the same. Moreover, with the reinforcing beam 24 extending in an inclined manner, the resistance to flexure in the lengthwise direction (A) is further improved to enhance the rigidity and durability of the entire offshore photovoltaic module assembly.

Specifically, the mounting bracket 2 further includes a first crosspiece rod 26 which has an end securely connected with the first outer wall 221 of the first pole 22 and which extends along the width direction (C) to have the other end securely connected with the first outer wall 221 of the first pole 22 of the other mounting bracket 2, and a second crosspiece rod 26 which has an end securely connected with the second outer wall 231 of the second pole 23 and which extends along the width direction (C) to have the other end securely connected with the second outer wall 221 of the second pole 22 of the other mounting bracket 2. Specifically, as shown in FIG. 5, except two terminal ends of the mounting brackets 2 in the width direction (C), the first crosspiece rods 26 of two adjacent mounting brackets 2 overlap each other in the lengthwise direction (A) at the first outer wall 221 to be fastened to each other and the first outer wall 221. The second crosspiece rods 26 of two adjacent mounting brackets 2 overlap each other in the lengthwise direction (A) at the second outer wall 231 to be fastened to each other and the second outer wall 231. With the first and second crosspiece rods 26 connected with the mounting brackets 2 along the width direction (C), the resistance of the first poles 22 and the second poles 23 of the mounting bracket assembly is improved so that the two terminal ends of the mounting brackets 2 in the width direction (C) may cope with the impact of waves coming in the width direction (C).

As illustrated, the mounting bracket 2 has an improved resistance to flexure to adapt to the complex marine environment, which is conducive to mounting of the offshore photovoltaic modules. With a plurality of the buoyancy bodies 21 arranged and spaced apart from one another, the impact of waves to the mounting brackets 2 may be reduced, thereby providing buffering to increase the stability thereof.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A mounting bracket for an offshore photovoltaic module, comprising:

a buoyancy body extending along a lengthwise direction;

a first pole disposed on and extending from said buoyancy body along a height direction that is transverse to the lengthwise direction, said first pole including a first outer wall which extends along a width direction that is transverse to both of the lengthwise direction and the height direction, and two first side walls which are spaced apart from each other in the width direction, each of said two first side walls extending from said first outer wall inwardly and along the lengthwise direction, said first outer wall and said two first side walls cooperatively defining a first extension slot which extends along the height direction;

a second pole disposed on and extending from said buoyancy body along the height direction and spaced apart from said first pole in the lengthwise direction, said second pole including a second outer wall which extends parallel to said first outer wall, and two second side walls which are spaced apart from each other in the width direction, each of said two second side walls extending from said second outer wall inwardly and along the lengthwise direction, said second outer wall and said two second side walls cooperatively defining a second extension slot which extends along the height direction;

a reinforcing beam extending along the lengthwise direction and connected with said first pole and said second pole, said reinforcing beam having two end portions which are respectively inserted into said first extension slot and said second extension slot, wherein a juncture between said reinforcing beam and said first pole is lower than a juncture between said reinforcing beam and said second pole along the height direction; and a carrying beam extending along the lengthwise direction and connected with said first pole and said second pole, said carrying beam including a top wall and two end walls which are spaced apart from each other in the width direction, each of said two end walls extending from said top wall along the height direction toward said buoyancy body, said top wall and said two end walls cooperatively defining an opened slot which extends along the lengthwise direction such that upper end portions of said first pole and said second pole are inserted into said opened slot.

2. The mounting bracket of claim 1, wherein a juncture between said first pole and said carrying beam is higher than a juncture between said second pole and said carrying beam along the height direction.

3. The mounting bracket of claim 1, wherein said buoyancy body includes a surrounding plate which surrounds and defines a surrounding space that is elongated along the lengthwise direction, and a plurality of partition walls which are disposed in said surrounding space and connected with said surrounding plate, said plurality of partition walls being spaced apart from one another in the lengthwise direction to divide said surrounding space with a plurality of buffering slots that are spaced apart from each other in the lengthwise direction and opened in the width direction.

4. The mounting bracket of claim 3, wherein said buoyancy body includes two tenon tongues which project from a top surface of said surrounding plate in the height direction and which are respectively connected with said first pole and said second pole, said two tenon tongues being inserted into said first extension slot and said second extension slot, respectively, along the height direction.

5. The mounting bracket of claim 3, wherein said top wall of said carrying beam has a plurality of elongated slots which are spaced apart from each other in the lengthwise direction and each of which extends in the width direction.

6. The mounting bracket of claim 1, further comprising a crosspiece rod which has an end securely connected with a selected one of said first pole and said second pole, and extends along the width direction.

7. The mounting bracket of claim 1, further comprising a first crosspiece rod which has an end securely connected with said first pole and extends along the width direction, and a second crosspiece rod which has an end securely connected with said second pole and extends along the width direction.

* * * * *